(12) United States Patent
Ahn et al.

(10) Patent No.: US 10,938,869 B2
(45) Date of Patent: Mar. 2, 2021

(54) CONFERENCE SYSTEM AND METHOD FOR CONTROLLING BANDWIDTH THEREOF

(71) Applicant: SAMSUNG SDS CO., LTD., Seoul (KR)

(72) Inventors: Ho-Sung Ahn, Seoul (KR); Hee-Tae Yoon, Seoul (KR); Jun-Ho Kang, Seoul (KR); Hong-Hyeon Lee, Seoul (KR); Ji-Won Jung, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 44 days.

(21) Appl. No.: 16/174,926

(22) Filed: Oct. 30, 2018

(65) Prior Publication Data

US 2019/0132370 A1  May 2, 2019

(30) Foreign Application Priority Data

Oct. 31, 2017 (KR) .................. 10-2017-0143118

(51) Int. Cl.
*H04L 29/06* (2006.01)
*H04L 12/26* (2006.01)

(52) U.S. Cl.
CPC .......... *H04L 65/403* (2013.01); *H04L 43/062* (2013.01); *H04L 43/0852* (2013.01); *H04L 43/0882* (2013.01); *H04L 65/602* (2013.01); *H04L 65/80* (2013.01)

(58) Field of Classification Search
CPC ..... H04L 65/403; H04L 65/80; H04L 65/602; H04L 43/0882; H04L 43/0852; H04L 43/062; H04L 43/0894; H04L 43/0829; H04L 12/1822

See application file for complete search history.

(56) References Cited

U.S. PATENT DOCUMENTS

| 7,899,170 B2* | 3/2011 | Jeong | H04Q 3/0045 370/261 |
| 8,767,593 B1* | 7/2014 | Allen | 370/260 |
| 10,356,777 B2* | 7/2019 | Banerjea | H04B 1/713 |
| 2003/0069976 A1* | 4/2003 | Boyle | H04L 29/12216 709/227 |

(Continued)

FOREIGN PATENT DOCUMENTS

| CN | 101742223 A | 6/2010 |
| CN | 102571526 A | 7/2012 |

(Continued)

OTHER PUBLICATIONS

Communication dated Sep. 27, 2020 by the State Intellectual Property Office of P.R. China in counterpart Chinese Patent Application No. 201811276253.6.

*Primary Examiner* — Hoang-Chuong Q Vu
(74) *Attorney, Agent, or Firm* — Sughrue Mion, PLLC

(57) ABSTRACT

Provided are a conference system and a method for controlling bandwidth thereof. According to embodiments of the present disclosure, the conference system enables a bandwidth pattern obtained from one terminal to be shared with other terminals connected to the conference in the same area as the terminal, such that a process of identifying bandwidths of users connected to the conference in the area may be omitted, thereby reducing a time required for stabilizing a service quality.

18 Claims, 10 Drawing Sheets

| BANDWIDTH DATA | PRIVATE IP ADDRESS | BSSID | PUBLIC IP ADDRESS | NUMBER OF USERS | WHETHER LOSS/DELAY OCCURS | MAXIMUM BANDWIDTH | GENERATING DATE (GENERATING TIME) |
|---|---|---|---|---|---|---|---|
| a | 172.16.0.0 | 00:08:52:09:03:BC | 203.109.0.10 | 2 PEOPLE | O | 500kbps | APRIL 1, 2017 |
| b | 172.16.0.0 | 00:08:52:09:03:BC | 203.109.0.10 | 3 PEOPLE | X | 300kbps | MAY 1, 2017 |
| c | 192.168.0.10 | 00:27:1C:5B:64:20 | 54.12.100.100 | 5 PEOPLE | O | 200kbps | MAY 25, 2017 |
| d | 192.168.0.10 | 00:27:1C:5B:64:20 | 54.12.100.100 | 7 PEOPLE | X | 100kbps | JUNE 15, 2017 |

(56) References Cited

U.S. PATENT DOCUMENTS

| | | | | |
|---|---|---|---|---|
| 2006/0187942 A1* | 8/2006 | Mizutani | ............... | H04L 47/808 |
| | | | | 370/401 |
| 2006/0245379 A1* | 11/2006 | Abuan | ................ | H04L 12/1827 |
| | | | | 370/261 |
| 2010/0149308 A1* | 6/2010 | Mihara | .................. | H04N 7/152 |
| | | | | 348/14.09 |
| 2011/0030037 A1* | 2/2011 | Olshansky | .............. | H04L 63/10 |
| | | | | 726/4 |
| 2012/0157106 A1* | 6/2012 | Wang | .................... | H04W 24/08 |
| | | | | 455/446 |
| 2013/0279354 A1* | 10/2013 | Ekman | ................ | H04L 41/5009 |
| | | | | 370/252 |
| 2014/0274194 A1* | 9/2014 | Nakamura | .......... | H04W 52/241 |
| | | | | 455/522 |
| 2015/0350603 A1* | 12/2015 | Assem Aly Salama | ..................... | |
| | | | | H04N 7/152 |
| | | | | 348/14.09 |
| 2018/0013503 A1* | 1/2018 | Nagase | ..................... | G06F 3/14 |
| 2018/0343192 A1* | 11/2018 | Antonyraj | ............... | H04L 43/08 |

FOREIGN PATENT DOCUMENTS

| | | | |
|---|---|---|---|
| CN | 104639866 A | 5/2015 | |
| CN | 106572502 A | 4/2017 | |

\* cited by examiner

FIG. 4

| BANDWIDTH DATA | PRIVATE IP ADDRESS | BSSID | PUBLIC IP ADDRESS | NUMBER OF USERS | WHETHER LOSS/DELAY OCCURS | MAXIMUM BANDWIDTH | GENERATING DATE (GENERATING TIME) |
|---|---|---|---|---|---|---|---|
| a | 172.16.0.0 | 00:08:52:09:03:BC | 203.109.0.10 | 2 PEOPLE | O | 500kbps | APRIL 1, 2017 |
| b | 172.16.0.0 | 00:08:52:09:03:BC | 203.109.0.10 | 3 PEOPLE | X | 300kbps | MAY 1, 2017 |
| c | 192.168.0.10 | 00:27:1C:5B:64:20 | 54.12.100.100 | 5 PEOPLE | O | 200kbps | MAY 25, 2017 |
| d | 192.168.0.10 | 00:27:1C:5B:64:20 | 54.12.100.100 | 7 PEOPLE | X | 100kbps | JUNE 15, 2017 |

CONFERENCE SYSTEM AND METHOD FOR CONTROLLING BANDWIDTH THEREOF

CROSS-REFERENCE TO RELATED APPLICATION(S)

This application claims priority from Korean Patent Application No. 10-2017-0143118, filed on Oct. 31, 2017, in the Korean Intellectual Property Office, the entire disclosure of which is incorporated herein by reference for all purposes.

BACKGROUND

1. Field

Embodiments of the present disclosure relate to technology for controlling a bandwidth in a multilateral conference system.

2. Description of the Related Art

Recently, with the development of voice and image processing technology, a conference service technology is being widely used, which provides functions such as voice/video calls, document sharing, screen sharing, writing sharing, and the like between users in a virtual conference room. Each terminal may remotely connect to a conference, provided by a conference server, to provide a multilateral voice/video conference service to users. Such multilateral voice/video conference may not only reduce travel time and costs, but also enable conference participants to have a face-to-face conference, thereby improving concentration in the conference.

In this case, each of the terminals determines a maximum bandwidth available in a current network according to a loss or a delay pattern of data transmitted and received by the terminals while being connected to the conference. This process, however, requires a considerable amount of time, during which a loss or a delay of data may occur, thereby deteriorating the quality of a conference service.

SUMMARY

Embodiments of the present disclosure relate to technology for rapidly identifying a maximum bandwidth available to users connected to a conference in the same area, thereby providing a conference service with improved quality.

According to an aspect of the present disclosure, there is provided a terminal configured to connect to a conference through a network, the terminal including: a connection manager configured to identify a number of other terminals connected to the conference in a same area as the terminal, and to calculate a total number of users connected to the conference in the area based on the number of the other terminals; a bandwidth analyzer configured to determine a maximum bandwidth available in the network according to a loss or a delay pattern of data transmitted and received while the terminal is connected to the conference; and a bandwidth manager configured to generate bandwidth data by mapping at least one of identification information for identifying an area to which the terminal belongs, time information indicating a current time, and information on the total number of users, to information on the maximum bandwidth, and in response to other terminals newly connecting to the conference in the area, configured to transmit the generated bandwidth data to the newly connected other terminals.

The connection manager may multicast a confirmation message to confirm whether the other terminals exist in the area, and in response to receiving the confirmation message multicast by the other terminals, the connection manager may identify the number of the other terminals based on a number of the received confirmation message.

The loss or delay pattern of the data may include one or more of a maximum bandwidth available in the network without a loss or delay of the data, information on whether the loss or delay of the data occurs, a bandwidth used at a time when the loss or delay occurs, and resolution of an image transmitted and received at a time when the loss or delay occurs.

The bandwidth analyzer may re-determine the maximum bandwidth every time the number of the other terminals, existing in the same area as the terminal, is changed.

The identification information may include one or more of a private IP address, a Basic Service Set Identifier (BSSID), and a public IP address of the terminal.

In response to receiving a push message indicating that one or more other terminals are newly connected to the conference, the connection manager may obtain information on whether the one or more other terminals exist in the area, and a total number of users connected to the conference in the area; and in response to determining that the one or more terminals exist in the area, the bandwidth manager may refer to the identification information and information on the total number of users, to transmit bandwidth data, corresponding to the area and the total number of users, among bandwidth data items stored in the terminal, to the one or more other terminals.

According to another aspect of the present disclosure, there is provided a conference system including: a terminal; and other terminal configured to receive bandwidth data from the terminal, and to control a bandwidth used in a network by using the received bandwidth data.

When including pre-stored bandwidth data, the other terminal may replace the pre-stored bandwidth data with the received bandwidth data by considering determination on whether the pre-stored bandwidth data are more recent than the received bandwidth data, determination on whether a loss or a delay occurs while obtaining the pre-stored bandwidth data, and determination on whether a loss or a delay occurs while obtaining the received bandwidth data.

When the received bandwidth data are more recent than the pre-stored bandwidth data, in response to the determination on whether a loss or a delay occurs while obtaining the received bandwidth data being true, or in response to both the determination on whether a loss or a delay occurs while obtaining the received bandwidth data and the determination on whether a loss or a delay occurs while obtaining the pre-stored bandwidth data being false, the other terminal may replace the pre-stored bandwidth data with the received bandwidth data, and in response to the determination on whether a loss or a delay occurs while obtaining the received bandwidth data being false, but the determination on whether a loss or a delay occurs while obtaining the pre-stored bandwidth data being true, the other terminal may maintain the pre-stored bandwidth data.

When the pre-stored bandwidth data are more recent than the received bandwidth data, in response to the determination on whether a loss or a delay occurs while obtaining the pre-stored bandwidth data being false, but the determination on whether a loss or a delay occurs while obtaining the received bandwidth data being true, the other terminal may replace the pre-stored bandwidth data with the received bandwidth data, and in response to the determination on whether a loss or a delay occurs while obtaining the received bandwidth data being false, or in response to both the determination on whether a loss or a delay occurs while obtaining the received bandwidth data and the determination on whether a loss or a delay occurs while obtaining the pre-stored bandwidth data being true, the other terminal may maintain the pre-stored bandwidth data.

According to yet another aspect of the present disclosure, there is provided a method for controlling bandwidth, the method including: by a connection manager of a terminal configured to connect to a conference through a network, identifying a number of other terminals connected to the conference in a same area as an area of the terminal; by the connection manager, calculating a total number of users connected to the conference in the area based on the number of other terminals; by a bandwidth analyzer of the terminal, determining a maximum bandwidth available in the network according to a loss or a delay pattern of data transmitted and received while the terminal is connected to the conference; by a bandwidth manager of the terminal, generating bandwidth data by mapping at least one of identification information for identifying an area to which the terminal belongs, time information indicating a current time, and information on the total number of users, to information on the maximum bandwidth; and by the bandwidth manager, in response to other terminals newly connecting to the conference, transmitting the generated bandwidth data to the newly connected other terminals.

The identifying of the number of other terminals may include multicasting a confirmation message to confirm whether the other terminals exist in the area, and in response to receiving the confirmation message multicast by the other terminals, identifying the number of the other terminals based on a number of the received confirmation message.

The loss or delay pattern of the data may include one or more of a maximum bandwidth available in the network without a loss or delay of the data, information on whether the loss or delay of the data occurs, a bandwidth used at a time when the loss or delay occurs, and resolution of an image transmitted and received at a time when the loss or delay occurs.

The determining of the maximum bandwidth may include re-determining the maximum bandwidth every time the number of the other terminals, existing in the same area as the terminal, is changed.

The identification information may include one or more of a private IP address, a Basic Service Set Identifier (BSSID), and a public IP address of the terminal.

The transmitting of the generated bandwidth data to the newly connected other terminals may include: by the connection manager, in response to receiving a push message indicating that one or more other terminals are newly connected to the conference, obtaining information on whether the one or more other terminals exist in the area, and a total number of users connected to the conference in the area; and by the bandwidth manager, in response to determining that the one or more terminals exist in the area, referring to the identification information and information on the total number of users, to transmit bandwidth data, corresponding to the area and the total number of users, among bandwidth data items stored in the terminal, to the one or more other terminals.

The method for controlling bandwidth may further include, subsequent to the transmitting of the generated bandwidth data to the newly connected other terminals, controlling, by the newly connected other terminals, a bandwidth used in the network by using the received bandwidth data.

The method for controlling bandwidth may further include, prior to the controlling of the bandwidth, when the newly connected other terminals include pre-stored bandwidth data, replacing, by the newly connected other terminals, the pre-stored bandwidth data with the received bandwidth data by considering determination on whether the pre-stored bandwidth data are more recent than the received bandwidth data, determination on whether a loss or a delay occurs while obtaining the pre-stored bandwidth data, and determination on whether a loss or a delay occurs while obtaining the received bandwidth data.

The replacing of the pre-stored bandwidth data with the received bandwidth data may include, when the received bandwidth data are more recent than the pre-stored bandwidth data, in response to the determination on whether a loss or a delay occurs while obtaining the received bandwidth data being true, or in response to both the determination on whether a loss or a delay occurs while obtaining the received bandwidth data and the determination on whether a loss or a delay occurs while obtaining the pre-stored bandwidth data being false, replacing the pre-stored bandwidth data with the received bandwidth data, and in response to the determination on whether a loss or a delay occurs while obtaining the received bandwidth data being false, but the determination on whether a loss or a delay occurs while obtaining the pre-stored bandwidth data being true, maintaining the pre-stored bandwidth data.

The replacing of the pre-stored bandwidth data with the received bandwidth data may include, when the pre-stored bandwidth data are more recent than the received bandwidth data, in response to the determination on whether a loss or a delay occurs while obtaining the pre-stored to bandwidth data being false, but the determination on whether a loss or a delay occurs while obtaining the received bandwidth data being true, replacing the pre-stored bandwidth data with the received bandwidth data, and in response to the determination on whether a loss or a delay occurs while obtaining the received bandwidth data being false, or in response to both the determination on whether a loss or a delay occurs while obtaining the received bandwidth data and the determination on whether a loss or a delay occurs while obtaining the pre-stored bandwidth data being true, maintaining the pre-stored bandwidth data.

BRIEF DESCRIPTION OF THE DRAWINGS

FIG. 4 is an example of bandwidth data according to an embodiment of the present disclosure.

DETAILED DESCRIPTION

Hereinafter, embodiments of the present disclosure will be described in detail with reference to the accompanying drawings. The following detailed description is provided for comprehensive understanding of a method, an apparatus, and/or a system described herein. However, it is merely exemplary and the present disclosure is not limited thereto.

In the following description, a detailed description of known functions and configurations incorporated herein will be omitted when it may obscure the subject matter of the present disclosure. Further, the terms used throughout this specification are defined in consideration of the functions of the present disclosure, and can be varied according to a purpose of a user or manager, or precedent and so on. Therefore, definitions of the terms should be made on the basis of the overall context. It should be understood that the terms used herein should be considered in a description sense only and not for purposes of limitation. Any references to singular may include plural unless expressly stated otherwise. In the present specification, it should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 1:
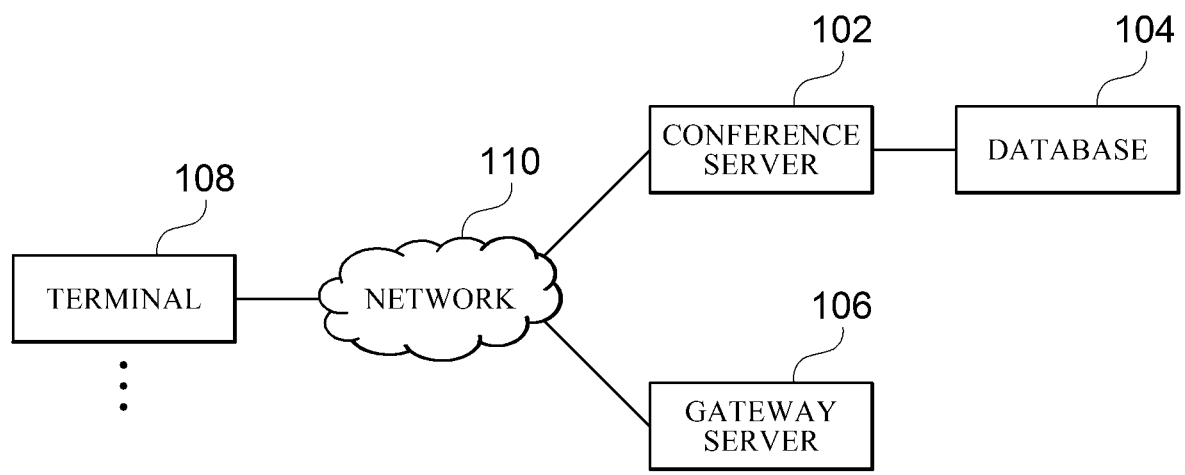
FIG. 1 is a block diagram illustrating a detailed configuration of a conference system according to an embodiment of the present disclosure.

FIG. 1 is a block diagram illustrating a detailed configuration of a conference system 100 according to an embodiment of the present disclosure. As illustrated in FIG. 1, the conference system 100 according to an embodiment of the present disclosure includes a conference server 102, a database 104, a gateway server 106, and a plurality of terminals 108.

The conference server 102 is a server for providing a conference service between two or more terminals 108. In the embodiments of the present disclosure, the conference service refers to a service for providing functions such as voice/video calls, document sharing, screen sharing, writing sharing, and the like between a plurality of users in a virtual conference room. The conference server 102 may initiate a conference at the request of a conference manager or a conference initiator, and may provide a web service for connection to the conference. The term "conference" is herein used in a broad sense to encompass an audio conference, a web conference, and the like. In response to input by a user, the terminals 108 may access a web page provided by the conference server 102, and may request connection to the conference.

Further, at the request of the terminals 108 for connection to the conference, the conference server 102 may receive one or more connection addresses for connection to the conference from the database 104, and may transmit the received connection addresses to the terminals 108. The terminals 108 may attempt to connect to the conference via the connection addresses.

The database 104 is a storage for storing one or more connection addresses available to the terminals 108. As described above, at the request of the terminals 108 for connection to the conference, the conference server 102 may transmit a request for the one or more connection addresses for connection to the conference to the database 104, and may receive the connection addresses from the database 104.

The gateway server 106 is connected to each gateway (not shown) for connection to the conference, and provides the terminals 108 with a connection result of connection attempts made by the terminals 108. Here, each gateway may be connected to the conference server 102, and the terminals 108 may connect to the conference, provided by the conference server 102, via at least one gateway.

In addition, once the terminals 108 complete connection to the conference, the gateway server 106 may receive, from the terminals 108, information on a private IP address, a Basic Service Set Identifier (BSSID), and the like of the terminals 108; and the gateway server 106 may identify a public IP address of the terminals 108 based on the received information and may transmit the identified public IP address to the terminals 108. As will be described below, the terminals 108 may determine a maximum bandwidth available in a network to which the terminals 108 are currently connected, and may generate bandwidth data by mapping identification information, including the private IP address, the BSSID, the public IP address, and the like of the terminals 108, time information indicating a current time, information on a total number of users connected to the conference in the same area as the terminals 108, to information on the maximum bandwidth. Then, the terminals 108 may store the generated bandwidth data in an internal storage, and may transmit the bandwidth data to other terminals which are newly connected to the conference in the same area as the terminals 108.

Further, once a new participant joins the conference, the gateway server 106 may transmit a push message, indicating entry of a new participant, to each of the terminals 108 connected to the conference. As will be described below, upon receiving the push message from the gateway server 108, the terminals 108 may identify a number of users connected to the conference in the same area as the terminals 108 (i.e., an area of a network to which the terminals 108 are connected).

The terminals 108 may be terminals used by ordinary users participating in (or connecting to) a conference provided by the conference server 102, and may include all types of communication devices, such as a desktop computer, a laptop computer, a tablet PC, a smartphone, and the like, which may receive a conference service.

As described above, in response to input by a user, the terminals 108 may access the web page provided by the conference server 102 to request connection to the conference, and may receive, from the gateway server 106, a connection result in response to the connection request. Further, upon completing connection to the conference, the terminals 108 may transmit the private IP address, the BSSID, and the like of the terminals 108 to the gateway server 106, and may receive the public IP address of the terminals 108 from the gateway server 106.

Then, the terminals 108 may identify a number of users connected to the conference in the same area as the terminals 108. The terminals 108 may receive the push message, indicating entry of a new participant, from the gateway server 106; and upon receiving the push message, the terminals 108 may multicast a confirmation message to confirm whether a terminal of the new participant, i.e., other terminal, exists in the same area as the area of the terminals 108. Each of one or more other terminals participating in the conference may also multicast the confirmation message. In the case where the terminals 108 receive the confirmation message multicast by the other terminals (or an ACK message of the confirmation message transmitted by the terminals 108), the terminals 108 may determine that the other terminals exist in the same area as the area of the terminals 108. In the case where the terminals 108 fail to receive the confirmation message multicast by the other terminals, the terminals 108 may determine that the other terminals do not exist in the same area as the area of the terminals 108.

Further, based on a number of the received confirmation messages, the terminals 108 may identify a number of the other terminals. Based on the identified number of the other terminals, the terminals 108 may calculate a total number of users connected to the conference in the same area as the area of the terminals 108. For example, in the case where the identified number of the other terminals is 5, the terminals 108 may determine that a total number of users connected to the conference is 6.

In addition, the terminals 108 may determine a maximum bandwidth available in the network according to a loss or a delay pattern of data transmitted and received while the terminals 108 are connected to the conference. Here, the loss or delay pattern of data may include one or more of a maximum bandwidth available in the network without a loss or delay of data, information on whether the loss or delay of data occurs, a network bandwidth at the time when the loss or delay occurs, and resolution of an image transmitted and received at the time when the loss or delay occurs.

For example, the terminals 108 may determine a maximum bandwidth, which is available without a loss or a delay of data, by gradually increasing a maximum bandwidth at predetermined intervals. In this case, every time a delay of data occurs, the terminals 108 may decrease the maximum bandwidth by a predetermined value, and every time a loss of data occurs, the terminals 108 may decrease the maximum bandwidth by a value equal to or greater than the predetermined value. In addition, the terminals 108 may compare resolution of an image, transmitted or received at the time when the loss or delay occurs, with a predetermined value, and may increase or decrease the maximum bandwidth based on the comparison. For example, in the case where the resolution of the image is equal to or greater than a predetermined value, the terminals 108 may increase the maximum bandwidth; and in the case where the resolution of the image is lower than a predetermined value, the terminals 108 may decrease the maximum bandwidth. In this manner, the terminals 108 may determine a maximum bandwidth available in the network by controlling the bandwidth according to a loss/delay pattern of data. In this case, the terminals 108 may re-determine the maximum bandwidth every time a number of terminals, located in the same area as the terminals 108, is changed. The aforementioned method of determining a maximum bandwidth is merely exemplary, and the method of determining the maximum bandwidth is not limited thereto.

Subsequently, the terminals 108 may generate bandwidth data by mapping identification information (e.g., the private IP address, the BSSID, the public IP address, and the like of the terminals 108) for identifying the area to which the terminals 108 belong, time information indicating a current time, and information on a number of users connected to the conference in the same area as the terminals 108, to information on the maximum bandwidth, and may store the generated bandwidth data in an internal storage. Generally, since connection environments (network, security, etc.) of users connected at the same location are almost the same, a bandwidth pattern obtained from one terminal 108 may be commonly and usefully used in other terminals located in the same area as the terminals 108. Accordingly, when one or more other terminals, located in the same area as the terminals 108, newly connect to the conference, the terminals 108 may share the bandwidth data with the one or more other terminals. As described above, by multicasting a confirmation message, the terminals 108 may identify the presence of other terminals connected to the conference in the same area as the terminals 108.

Specifically, upon receiving a push message indicating entry of a new participant from the gateway server 106, the terminals 108 multicast a confirmation message; and upon receiving the confirmation message multicast by the other terminals, the terminals 108 may confirm that the other terminals are newly connected to the conference in the same area as the terminals 108. Further, based on the number of the received confirmation messages, the terminals 108 may identify the number of other terminals connected to the conference in the same area as the terminals 108; and based on the identified number of other terminals, the terminals 108 may calculate a total number of users connected to the conference in the same area as the terminals 108. Accordingly, the terminals 108 may extract bandwidth data, corresponding to the area and the calculated total number of users, from among the bandwidth data items stored in the internal storage, and may share the extracted bandwidth data with the other terminals.

The other terminals may control a bandwidth used in a network by using the bandwidth data, in which case a process of identifying a bandwidth may be omitted, thereby reducing a time required for stabilizing a service quality. If other terminals include pre-stored bandwidth data, the other terminals may determine a data item to be used for controlling bandwidth among the bandwidth data, by considering determination on whether the pre-stored bandwidth data are more recent than the received bandwidth data, determination on whether a loss or a delay occurs while obtaining the pre-stored bandwidth data, and determination on whether a loss or a delay occurs while obtaining the received bandwidth data, which will be described in detail with reference to FIG. 9.

The conference server 102, the gateway server 106, and the terminal 108 may transmit and receive data to and from each other through the network 110. In some embodiments, examples of the network 110 may include the Internet, one or more local area networks, wire area networks, cellular networks, mobile networks, other types of networks, or a combination of these networks.

Moreover, it should be noted that for convenience of explanation, the conference server 102, the database 104, and the gateway server 106 are illustrated as separate parts, but the present disclosure is not limited thereto, and the conference server 102, the database 104, and the gateway server 106 are separated only in terms of functions, and may be located in a single hardware component.

In one embodiment, the conference server 102, the database 104, the gateway 106, and the terminals 108 may be implemented in one or more computing devices including one or more processors and a computer-readable recording medium connected to the processors. The computer-readable recording medium may be located inside or outside the processors, and may be connected to the processors by various well-known means. The processors located inside the computing devices may allow each computing device to operate according to the exemplary embodiments described herein. For example, the processors may execute instructions stored in the computer-readable recording medium; and when the instructions stored in the computer-readable recording medium are executed by the processors, the instructions may cause the 2o computing devices to perform operations according to the exemplary embodiments described herein.

Figure 2:
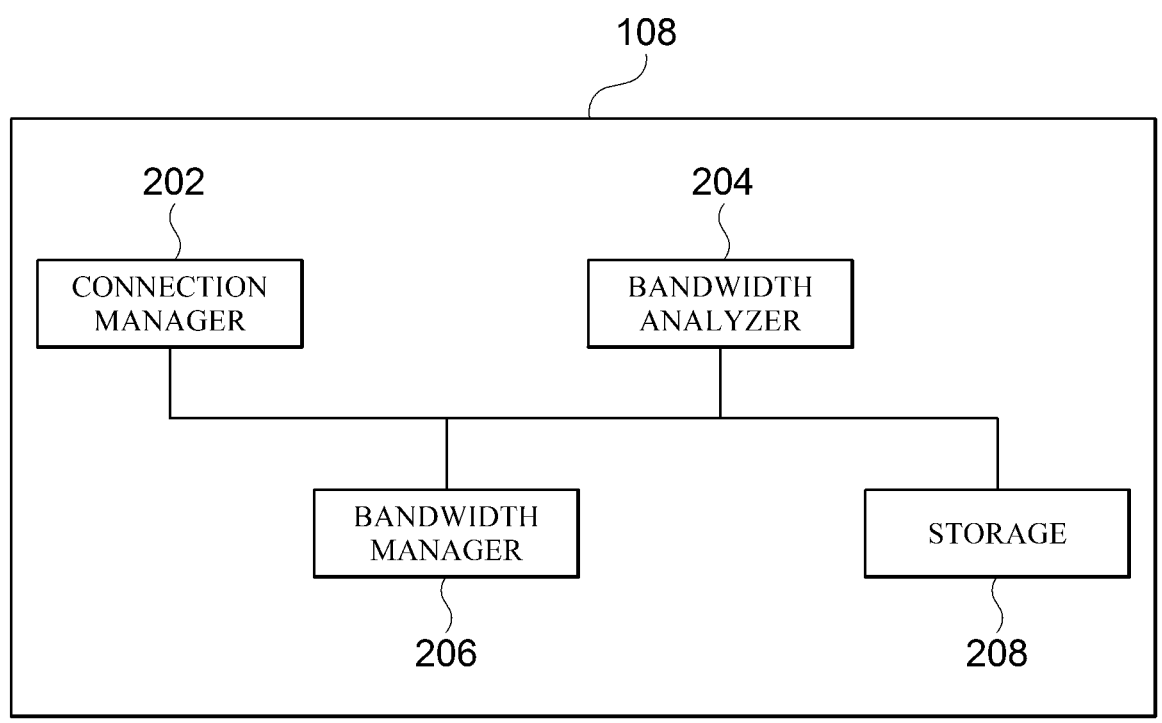
FIG. 2 is a block diagram illustrating a detailed configuration of a terminal according to an embodiment of the present disclosure.

FIG. 2 is a block diagram illustrating a detailed configuration of a terminal 108 according to an embodiment of the present disclosure. As illustrated in FIG. 2, the terminal 108 according to an embodiment of the present disclosure includes a connection manager 202, a bandwidth analyzer 204, a bandwidth manager 206, and a storage 208.

The connection manager 202 may attempt to connect to a conference via a network. To this end, in response to input by a user, the connection manager 202 may access a web page provided by a conference server 102 to request connection to the conference, and may receive one or more connection addresses for connection to the conference from the conference server 102. Then, the connection manager 202 may attempt to connect to the conference via the connection addresses, and may receive a connection result of the connection attempt from the gateway server 106.

Upon completing connection to the conference, the connection manager 202 may transmit the private IP address, the BSSID, and the like of the terminal 108 to the gateway server 106, and may receive the public IP address of the terminal 108 from the gateway server 106.

Further, upon receiving a push message indicating that one or more other terminals are connected to the conference, the connection manager 202 may identify a number of the one or more other terminals connected to the conference. For example, in the case where the other terminals newly connect to the conference, the connection manager 202 may receive the push message, indicating that the other terminals are connected to the conference, from the gateway server 106. However, the push message is not necessarily required to be received from the gateway server 106, but may be received from the conference server 102 or a separate push server (not shown). Specifically, the connection manager 202 may multicast a confirmation message to confirm whether the other terminals exist in the same area as the terminal 108; and upon receiving the confirmation message multicast by the other terminals, the connection manager 202 may identify a number of the other terminals based on the number of the received confirmation messages. Based on the number of the other terminals, the connection manager 202 may calculate a total number of users connected to the conference in the same area as the terminal 108.

The bandwidth analyzer 204 may determine a maximum bandwidth available in the network according to a loss or a delay pattern of data transmitted and received while the terminal 108 is connected to the conference. Here, the loss or delay pattern of data may include one or more of a maximum bandwidth available in the network without a loss or a delay of data, information on whether a loss or a delay of data occurs, a network bandwidth at the time when the loss or delay occurs, and resolution of an image transmitted and received at the time when the loss or delay occurs. The bandwidth analyzer 204 may re-determine the maximum bandwidth every time the number of the other terminals, located in the same area as the terminal 108, is changed. Further, the bandwidth analyzer 204 may re-calculate the maximum bandwidth every time a current location of the terminal 108 (or the aforementioned identification information of the terminal 108) is changed.

The bandwidth manager 206 may generate bandwidth data by mapping at least one of identification information for identifying an area to which the terminal 108 belongs, time information indicating a current time, and information on the total number of users, to information on the maximum bandwidth; and may store the generated bandwidth data in the storage 208. Here, the identification information of the terminal 108 may include one or more of the private IP address, the BSSID, and the public IP address of the terminal 108. In the case where other terminals newly connect to the conference, the bandwidth manager 206 may share the generated bandwidth data with the other terminals.

Specifically, upon receiving a push message indicating entry of a new participant from the gateway server 106, the conference server 102, or a push server, the connection manager 202 may multicast a confirmation message; and based on the number of the received confirmation messages, the connection manager 202 may calculate a total number of users connected to the conference in the same area as the terminals 108. Then, the connection manager 202 may extract bandwidth data, corresponding to the area and the calculated total number of users, from among the bandwidth data items stored in the storage 208, and may multicast the extracted bandwidth data to transmit the bandwidth data to the other terminals. In this case, the other terminals may control the bandwidth used in the network by using the bandwidth data.

Further, the bandwidth manager 206 may receive bandwidth data from the other terminals, and may control the bandwidth by using the received bandwidth data. If the terminal 108 includes pre-stored bandwidth data, the bandwidth manager 206 may determine a data item to be used for controlling bandwidth among the bandwidth data, by considering determination on whether the pre-stored bandwidth data are more recent than the received bandwidth data, determination on whether a loss or a delay occurs while obtaining the pre-stored bandwidth data, and determination on whether a loss or a delay occurs while obtaining the received bandwidth data.

The storage 208 is a storage for storing the bandwidth data generated by the bandwidth manager 206. As described above, the bandwidth manager 206 may transmit the bandwidth data items, stored in the storage 208, to the other terminals connected to the conference in the same area as the terminal 108.

Figure 3:
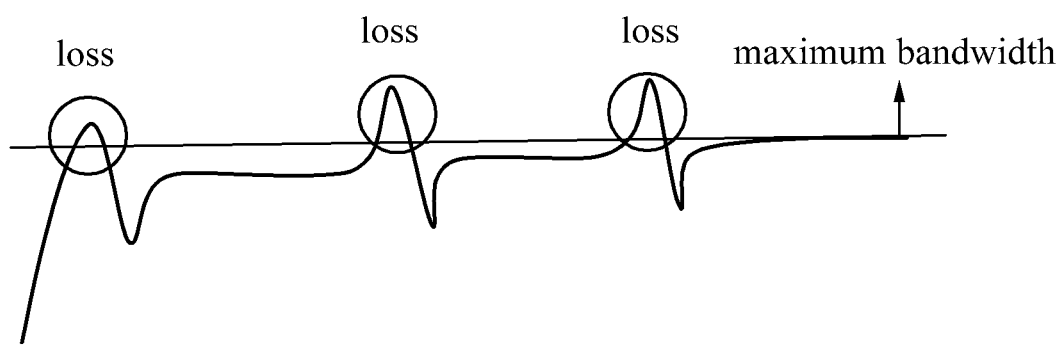
FIG. 3 is a diagram illustrating an example of a loss or a delay pattern of data according to an embodiment of the present disclosure.

FIG. 3 is a diagram illustrating an example of a loss or a delay pattern of data according to an embodiment of the present disclosure. As described above, the bandwidth analyzer 204 may determine a maximum bandwidth available in the network according to a loss or a delay pattern of data transmitted and received while a terminal is connected to a conference.

Referring to FIG. 3, the bandwidth analyzer 204 may determine a maximum bandwidth, which is available without a loss or a delay of data, by gradually increasing a maximum bandwidth at predetermined intervals. Here, a horizontal axis denotes a time, a vertical axis denotes a used bandwidth, and a portion indicated by a circle denote a portion where a loss occurs.

In this case, every time a loss (or delay) of data occurs, the terminal 108 may decrease the maximum bandwidth. Further, the terminal 108 may compare resolution of an image transmitted and received at the time when the loss (or delay) occurs with a predetermined value, and may increase or decrease the maximum bandwidth based on the comparison. In this manner, the terminal 108 may determine the maximum bandwidth available in the network by controlling a bandwidth according to the loss/delay pattern of data. 10o FIG. 4 is an example of bandwidth data according to an embodiment of the present disclosure. As described above, the terminal 108 may generate bandwidth data by mapping identification information (e.g., the private IP address, the BSSID, the public IP address, and the like of the terminal 108) for identifying an area to which the terminal 108 belongs, time information indicating a current time (or current date), and information on a total number of users connected to the conference in the same area as the terminal 108, to information on a maximum bandwidth; and may store the generated bandwidth data in the internal storage.

Generally, a user may attempt to connect to the conference while moving around in various areas (e.g., home, company, etc.) with the terminal 108, in which case it is required to distinguish the obtained bandwidth patterns (i.e., maximum bandwidth) according to the areas to which the terminal 108 belongs, i.e., locations of the terminal 108. Further, even in the same area, the bandwidth patterns may vary depending on the total number of users connected to the conference, such that it is required to differentiate the obtained bandwidth patterns according to the total number of users. Accordingly, by matching the identification information of the terminal 108 and the total number of users connected to the conference with a connection sequence table and storing the matched information, it is possible to determine an area and a number of conference participants, for which the connection sequence table is useful. Further, the bandwidth data may include information whether a loss or a delay of data occurs while obtaining the bandwidth data.

Referring to FIG. 4, bandwidth data 'a' and 'b' are mapped to a private IP address "172.16.0.0", a BSSID "00:08:52:09:03:BC", a public IP address "203.109.0.10", a total number of users "two (or three)", occurrence of a loss or a delay "true (O)" (or "false (X)"), and a maximum bandwidth "500 kbps (or 300 kbps)", respectively; and bandwidth data 'c' and 'd' are mapped to a private IP address "192.168.0.10", a BSSID "00:27:1C:5B:64:20", a public IP address "54.12.100.100", a total number of users "five (or seven)", occurrence of a loss or a delay "true (O)" (or "false (X)"), and a maximum bandwidth "200 kbps (or 100 kbps)", respectively. In the above example, the bandwidth data 'a' and 'b' are bandwidth patterns accumulated while the terminal 108 uses a conference service on the first floor of a company building; and the bandwidth data 'c' and 'd' are bandwidth patterns accumulated while the terminal 108 uses a conference service on the eighth floor of a company building. The illustrated identification information of the terminal 108 may be used to determine an area in which the bandwidth data are useful; the information on the total number of users may be used to determine a current number of conference participants for which the bandwidth data are useful; and the time information may be used to determine a bandwidth data item to be used when there are a plurality of bandwidth data items. In addition, the bandwidth data may further include information on whether a loss or a delay of data occurs while obtaining the bandwidth data, a bandwidth used at the time when the loss or delay occurs, resolution of an image transmitted and received at the time when the loss or delay occurs, and the like; and these information items may be used to determine a bandwidth data item to be used when there are a plurality of bandwidth data items.

Figure 5:
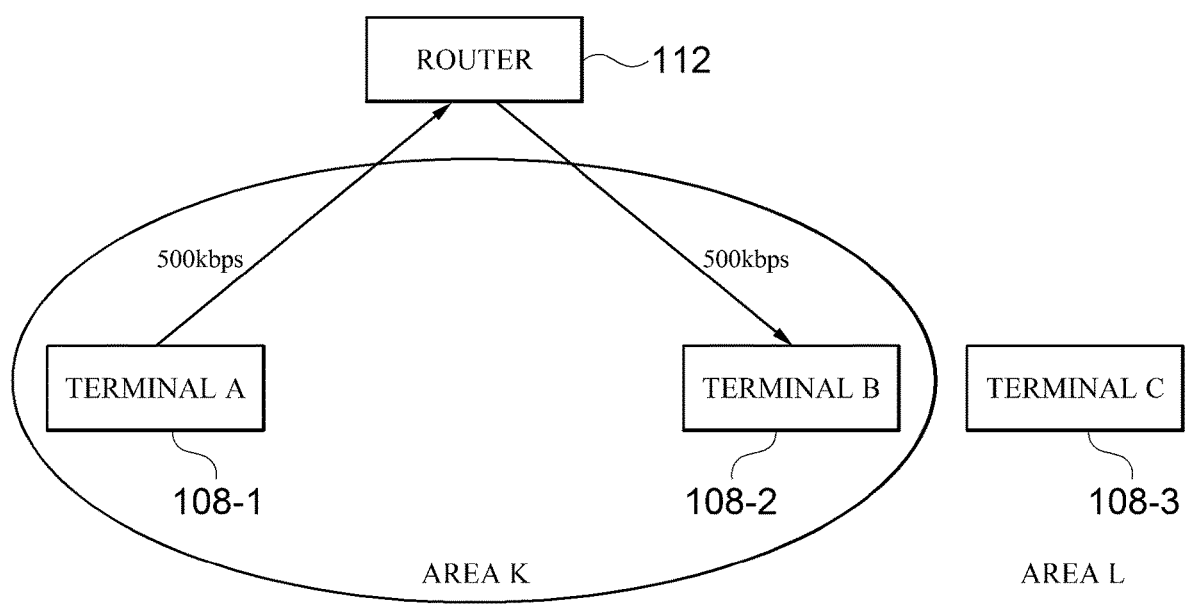
FIG. 5 is a diagram illustrating an example of a process in which a terminal shares bandwidth data with other terminals existing in the same area as the terminal according to an embodiment of the present disclosure.
Figure 6:
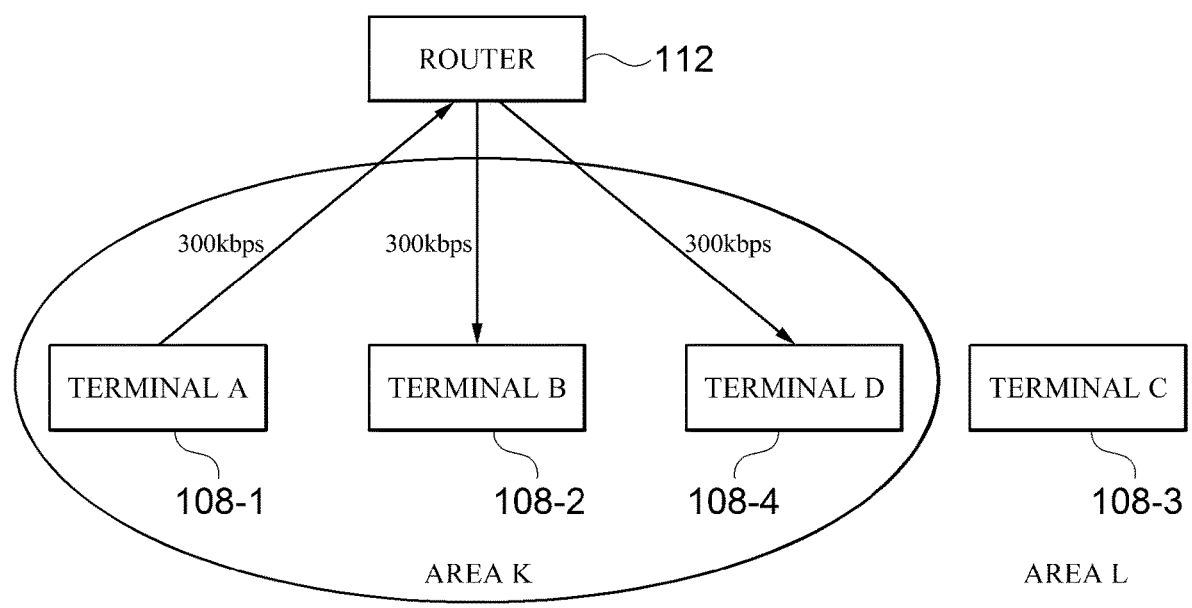
FIG. 6 is a diagram illustrating an example of a process in which a terminal shares bandwidth data with other terminals existing in the same area as the terminal according to an embodiment of the present disclosure.

FIGS. 5 and 6 are diagrams illustrating an example of a process in which a terminal 108 shares bandwidth data with other terminals existing in the same area as the terminal 108 according to an embodiment of the present disclosure.

Referring to FIG. 5, in the case where while a terminal A 108-1 is connected to a conference, a terminal B 108-2 and a terminal C 108-3 newly connect to the conference, the terminal A 108-1 multicasts a confirmation message to determine whether there are other terminals in the same area as the terminal A 108-1, and may receive the confirmation message from the terminal B 108-2. Accordingly, the terminal A 108-1 may determine that the terminal B 108-2 is located in the same area and a total number of users connected to the conference in the area is two. In this case, the terminal A 108-1 may multicast bandwidth data, e.g., bandwidth data 'a' (i.e., bandwidth data regarding a maximum bandwidth of 500 kbps), which corresponds to the area and the total number of users among the bandwidth data items stored in the terminal A 108-1, to transmit the bandwidth data to the terminal B 108-2.

Then, referring to FIG. 6, in the case where while the terminal A 108-1 is connected to a conference, the terminal B 108-2, the terminal C 108-3, and a terminal D 108-4 newly connect to the conference, the terminal A 108-1 multicasts a confirmation message to determine whether there are other terminals in the same area as the terminal A 108-1, and may receive the confirmation message from the terminal B 108-2 and the terminal D 108-4. Accordingly, the terminal A 108-1 may determine that the terminal B 108-2 and the terminal D 108-4 are located in the same area and a total number of users connected to the conference in the area is three. In this case, the terminal A 108-1 may multicast bandwidth data, e.g., bandwidth data 'b' (i.e., bandwidth data regarding a maximum bandwidth of 300 kbps), which corresponds to the area and the total number of users among the bandwidth data items stored in the terminal A 108-1, to transmit the bandwidth data to the terminal B 108-2 and the terminal D 108-4.

Figure 7:
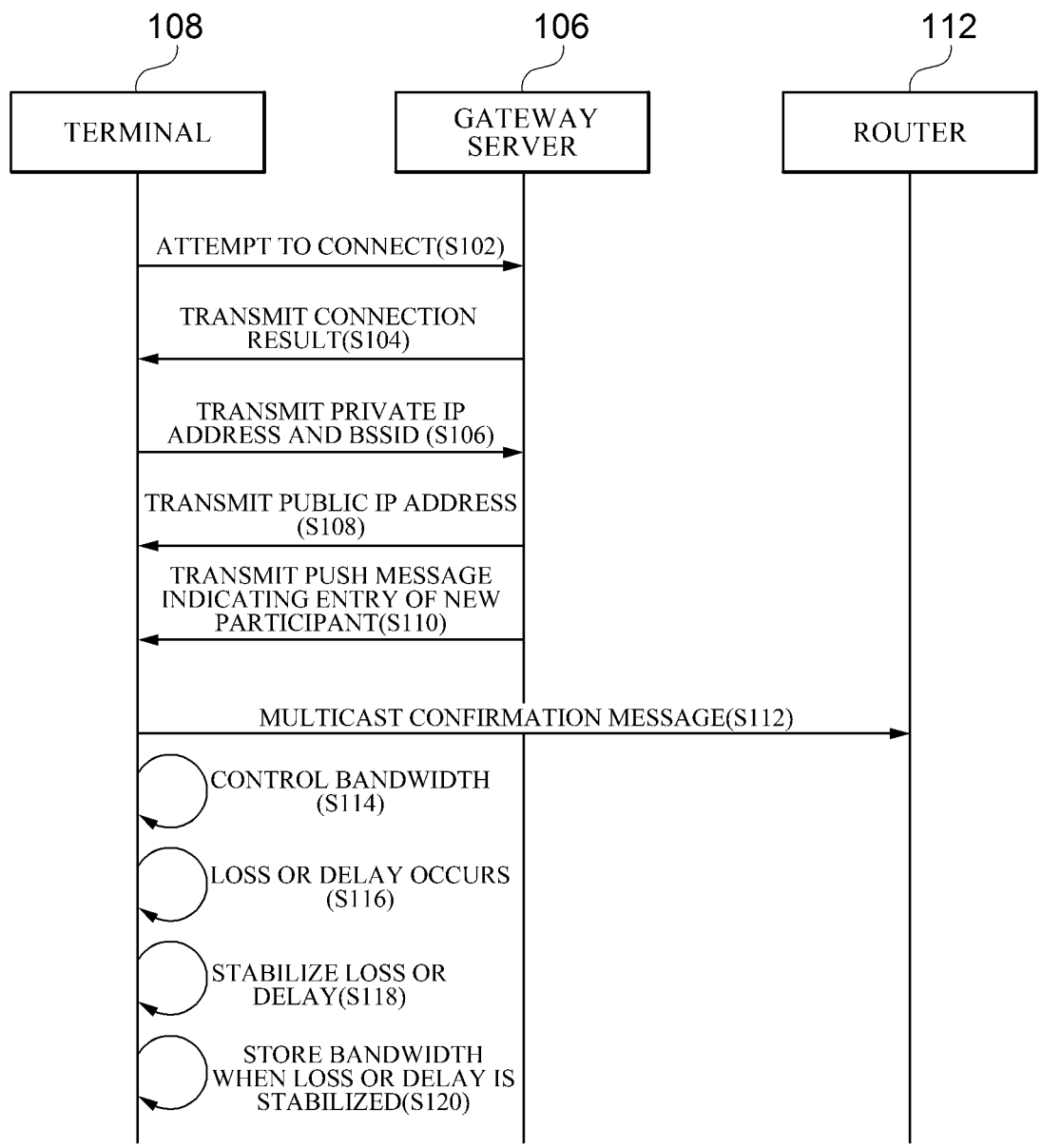
FIG. 7 is a flowchart explaining a method for controlling bandwidth according to an embodiment of the present disclosure.

FIG. 7 is a flowchart explaining a method for controlling bandwidth according to an embodiment of the present disclosure. While the flowchart illustrated in FIG. 7 shows that the method is divided into a plurality of operations, at least some of the operations may be performed in different order, may be combined to be performed concurrently, may be omitted, may be performed in sub-operations, or one or more operations not shown in the drawing may be added and performed.

In S102, the terminal 108 attempts to connect to the conference via the gateway server 106.

In S104, the gateway server 106 transmits a connection result of the connection attempt to the terminal 108.

In S106, the terminal 108 transmits its private IP address and BSSID to the gateway server 106.

In S108, the gateway server 106 identifies the public IP address of the terminal 108 based on the private IP address and the BSSID, and transmits the public IP address to the terminal 108.

In S110, the gateway server 106 transmits a push message, indicating that a new participant is connected to the conference, to the terminal 108.

In S112, the terminal 108 multicasts a confirmation message to confirm whether there are other terminals in the same area as the terminal 108. Upon receiving the confirmation message multicast by other terminals, the terminal 108 may identify the number of other terminals based on the number of the received confirmation messages. Further, the terminal 108 may calculate the total number of users connected to the conference in the area based on the number of other terminals.

In S114, the terminal 108 controls a bandwidth currently in use on a network.

In S116, upon controlling the bandwidth, the terminal 108 determines whether a loss or a delay of data occurs.

In S118, in response to occurrence of a loss or a delay of data, the terminal 108 stabilizes the loss or delay (i.e., removes the loss or delay) by continuously controlling the bandwidth.

In S120, the terminal 108 stores a bandwidth (i.e., maximum bandwidth) at the time when the loss or delay is stabilized.

Figure 8:
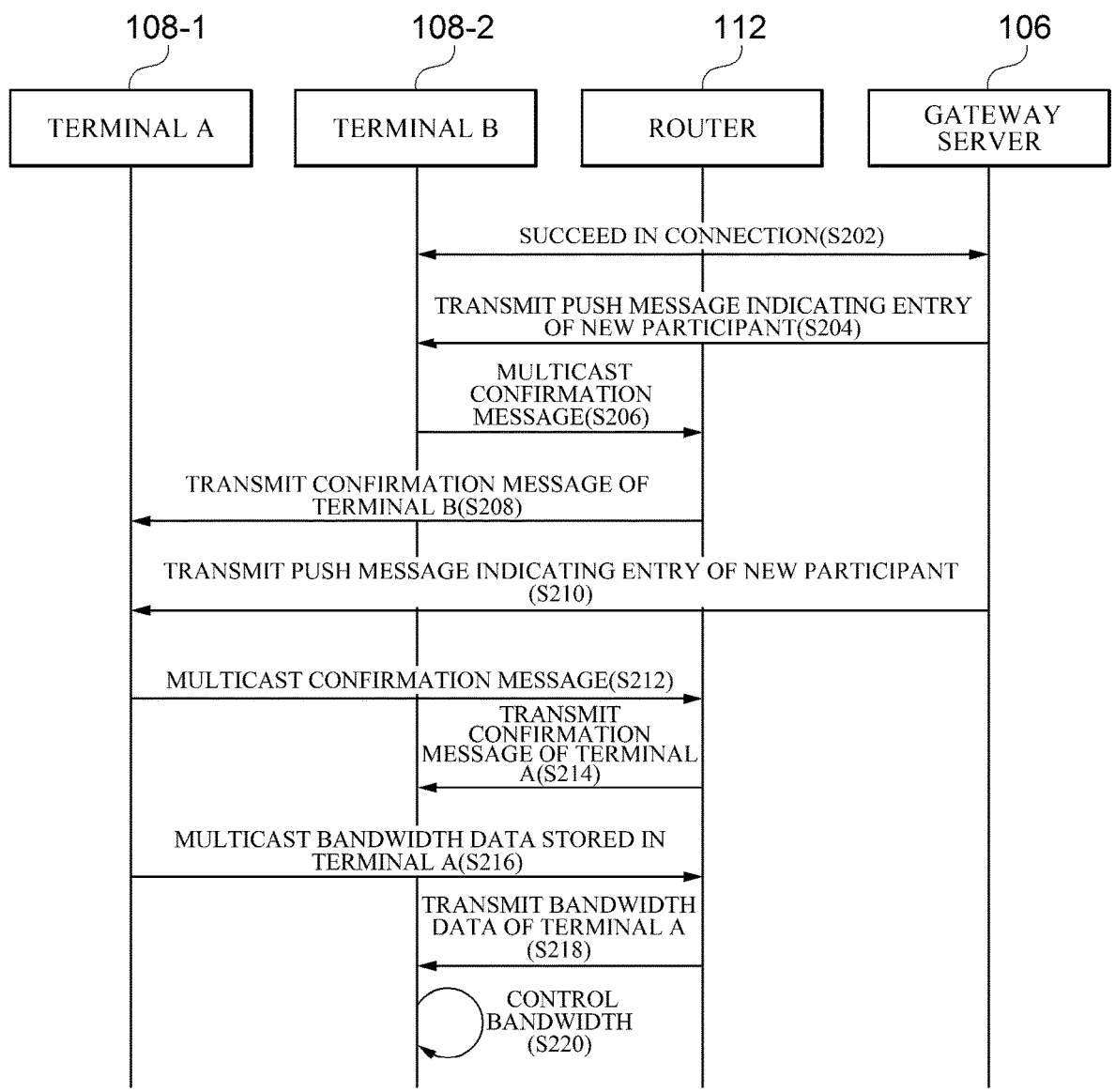
FIG. 8 is a flowchart explaining a method for sharing bandwidth data between terminals according to an embodiment of the present disclosure.

FIG. 8 is a flowchart explaining a method for sharing bandwidth data between terminals 108 according to an embodiment of the present disclosure. While the flowchart illustrated in FIG. 8 shows that the method is divided into a plurality of operations, at least some of the operations may be performed in different order, may be combined to be performed concurrently, may be omitted, may be performed in sub-operations, or one or more operations not shown in the drawing may be added and performed. Here, for convenience of explanation, it is assumed that while the terminal A 108-1 is connected to a conference, the terminal B 108-2 located in the same area as the terminal A 108-1 newly connects to the conference.

In S202, the terminal B 108-2 completes connection to the conference via the gateway server 106.

In S204, the gateway server 106 transmits a push message, indicating that the terminal B 108-2 is connected to the conference, to the terminal B 108-2.

In S206, the terminal B 108-2 multicasts a confirmation message to confirm whether other terminals are located in the same area as the terminal B 108-2.

In S208, a router 112 transmits the confirmation message, multicast by the terminal B 108-2, to the terminal A 108-1 located in the same area as the terminal B 108-2.

In S210, the gateway server 106 transmits the push message, indicating that the terminal B 108-2 is connected to the conference, to the terminal A 108-1.

In S212, the terminal A 108-1 multicasts a confirmation message to confirm whether other terminals are located in the same area as the terminal A 108-1.

In S214, the router 112 transmits the confirmation message, multicast by the terminal A 108-1, to the terminal B 108-2 located in the same area as the terminal A 108-1. In this manner, the terminal A 108-1 and the terminal B 108-2 may confirm that they are located in the same area.

In S216, the terminal A 108-1 multicasts bandwidth data, corresponding to the area and a total number of users (e.g., two) connected to the conference, among bandwidth data items stored in the terminal A 108-1.

In S218, the router 112 transmits the bandwidth data, multicast by the terminal A 108-1, to the terminal B 108-2. As described above, each of the terminals 108 may multicast a confirmation message to confirm whether other terminals are located in the same area; and upon determining that other terminals are located in the same area, each of the terminals 108 may multicast bandwidth data, corresponding to the area and a total number of users connected to the conference, among the bandwidth data items included in each of the terminals 108, thereby sharing their bandwidth data with other terminals.

In S220, the terminal B 108-2 control a bandwidth, used in a network, by using the bandwidth data.

Figure 9:
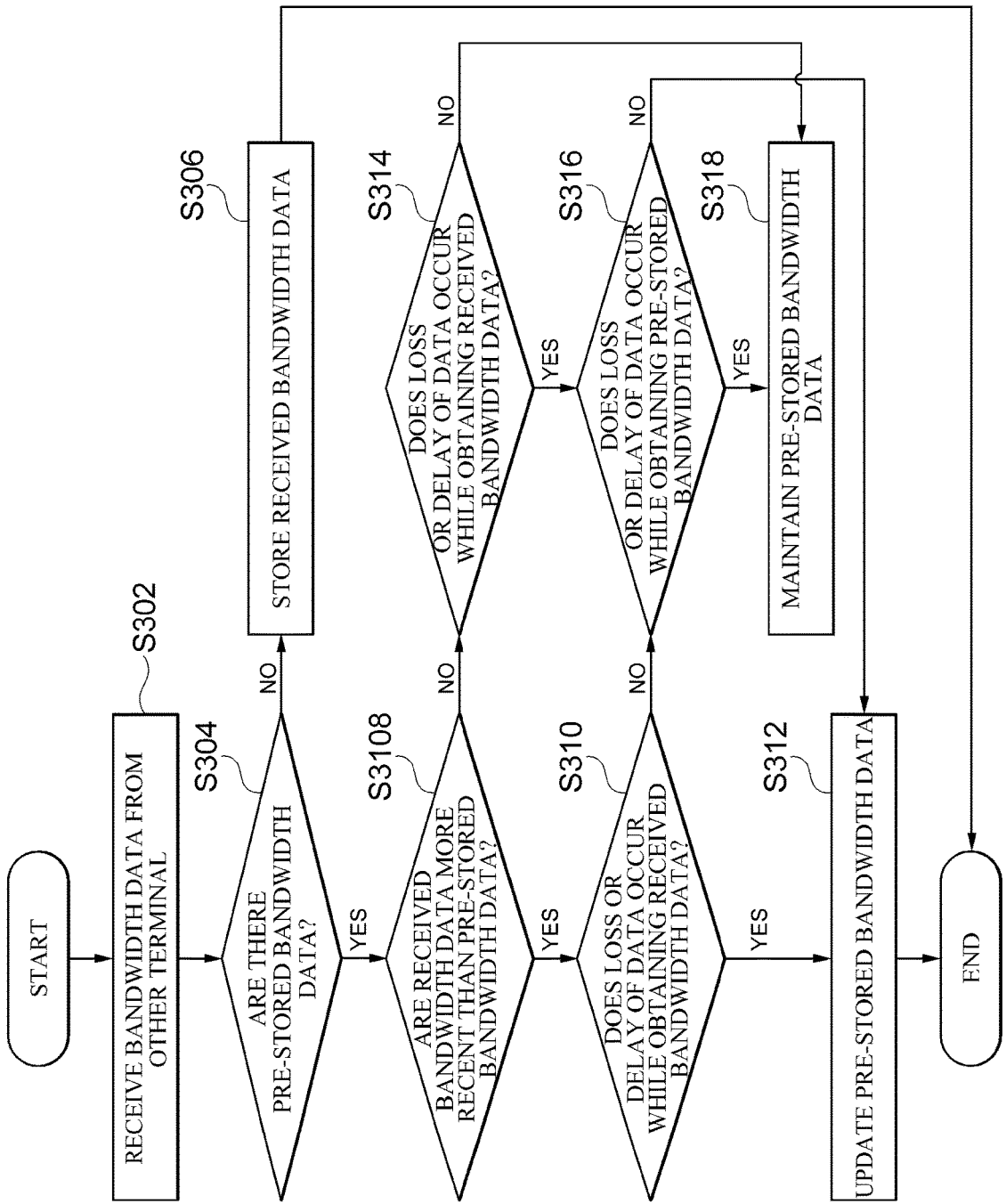
FIG. 9 is a flowchart explaining a method for updating bandwidth data by a terminal according to an embodiment of the present disclosure.

FIG. 9 is a flowchart explaining a method for updating bandwidth data by a terminal according to an embodiment of the present disclosure.

In S302, the terminal 108 receives bandwidth data from one or more other terminals.

In S304, the terminal 108 determines whether there are pre-stored bandwidth data.

Upon determining in S304 that there are no pre-stored bandwidth data, the terminal 108 stores the bandwidth data received from the one or more other terminals in S306.

Upon determining in S304 that there are pre-stored bandwidth data, the terminal 108 determines whether the received bandwidth data are more recent than the pre-stored bandwidth data in S308.

Upon determining in S308 that the received bandwidth data are more recent than the pre-stored bandwidth data, terminal 108 confirms whether a loss or a delay of data occurs while obtaining the received bandwidth data in S310. That is, by analyzing the received bandwidth data, the terminal 108 may confirm whether the loss or delay occurs while obtaining the received to bandwidth data. Reliability of a maximum bandwidth may be relatively higher in the case where a loss or a delay of data occurs while obtaining the bandwidth data than in the case where a loss or a delay of data does not occur while obtaining the bandwidth data. For example, when an actual maximum bandwidth is 800 kbps, in the case where three terminals 108 increase/decrease the bandwidth in the vicinity of 100 kbps, a maximum bandwidth of 200 kbps may be recorded without any occurrence of a loss or a delay of data. In another example, when an actual maximum bandwidth is 800 kbps, in the case where three terminals 108 increase/decrease the bandwidth in the vicinity of 900 kbps, a loss or a delay of data may occur, and thus a maximum bandwidth of 750 kbps may be recorded. As described above, a loss or a delay of data, occurring while controlling a bandwidth, may increase a probability that a maximum bandwidth recorded by the terminal 108 is approximate to the actual maximum bandwidth. As illustrated in FIG. 4, information on whether the loss or delay of data occurs may be included in the bandwidth data.

Upon determining in S310 that occurrence of the loss or delay while obtaining the received bandwidth data is true (i.e., the loss or delay occurs while obtaining the received bandwidth data), the terminal 108 may update the pre-stored bandwidth data by replacing the pre-stored bandwidth data with the received bandwidth data in S312.

Further, upon determining in S308 that the pre-stored bandwidth data are more recent than the received bandwidth data, the terminal 108 may determine whether a loss or a delay occurs while obtaining the received bandwidth data in S314. Upon determining in S314 that occurrence of the loss or delay while obtaining the received bandwidth data is false (i.e., the loss or delay does not occur while obtaining the received bandwidth data), the terminal 108 may maintain the pre-stored bandwidth data, and may discard the received bandwidth data.

Upon determining in S314 that occurrence of the loss or delay while obtaining the received bandwidth data is true, the terminal 108 determines whether a loss or a delay occurs while obtaining the pre-stored bandwidth data in S316. Upon determining in S316 that occurrence of the loss or delay while obtaining the pre-stored bandwidth data is false (i.e., a loss or a delay does not occur while obtaining the pre-stored bandwidth data), the terminal 108 may update the bandwidth data by replacing the pre-stored bandwidth data with the received bandwidth data.

Upon determining in S316 that occurrence of the loss or delay while obtaining the pre-stored bandwidth data is true (i.e., a loss or a delay occurs while obtaining the pre-stored bandwidth data), the terminal 108 may maintain the pre-stored bandwidth data, and may discard the received bandwidth data in S318.

Figure 10:
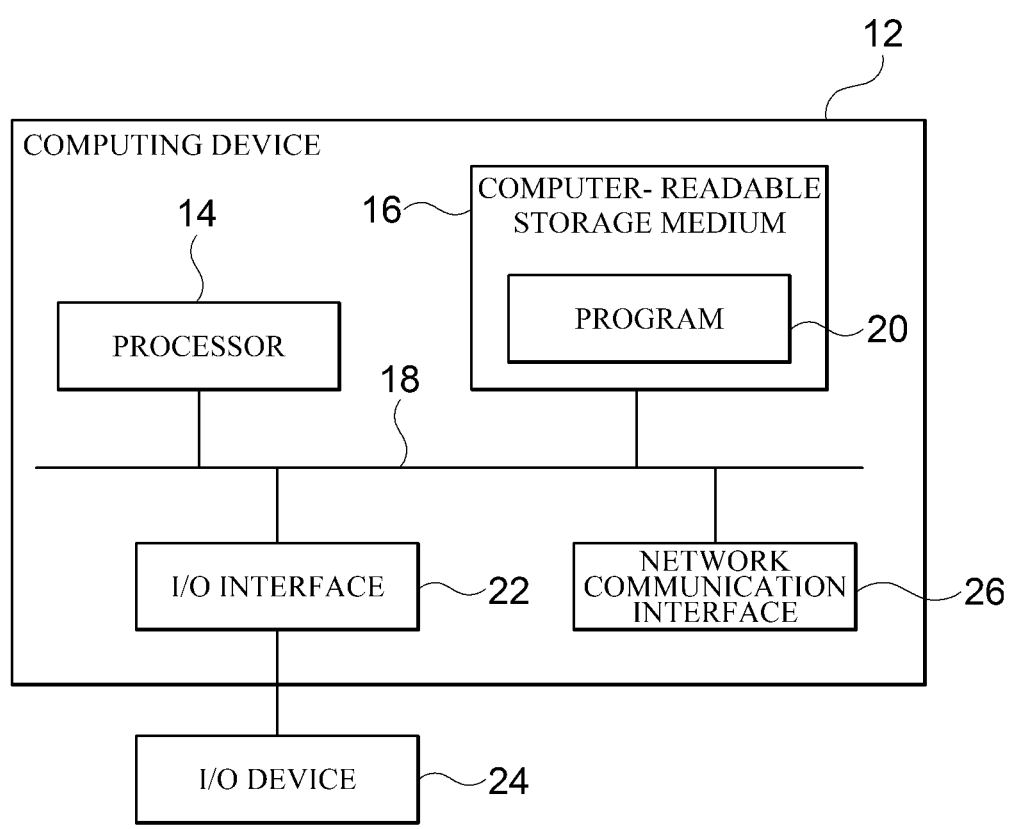
FIG. 10 is a block diagram explaining an example of a computing environment which includes a computing device suitable for use in exemplary embodiments.

FIG. 10 is a block diagram explaining an example of a computing environment 10 which includes a computing device suitable for use in exemplary embodiments. In the illustrated embodiment, each component may include functions and capabilities different from those described below, and may further include components in addition to those described below.

The illustrated computing environment 10 includes a computing device 12. In one embodiment, the computing device 12 may be the terminal 108, the conference server 102, or the gateway server 106. The computing device 12 includes at least one processor 14, a computer-readable storage medium 16, and a communication bus 18. The processor 14 may control the computing device 12 to operate according to the above-described exemplary embodiments. For example, the processor 14 may execute one or more programs stored on the computer-readable storage medium 16. The one or more programs may include one or more computer-executable instructions, which when being executed by the processor 14, may cause the computing device 12 to perform operations according to the exemplary embodiments.

The computer-readable storage medium 16 stores computer-executable instructions, program codes, program data, and/or other suitable types of information. The programs 20 stored on the computer-readable storage medium 16 may include a set of instructions which may be executed by the processor 14. In one embodiment, the computer-readable storage medium 16 may be a memory (volatile and non-volatile memory such as a random access memory, or a suitable combination thereof), one or more magnetic disc storage devices, optical disk storage devices, flash memory devices, and other types of storage media that are accessed by the computing device 12 and may store desired information, or a suitable combination thereof.

The communication bus 18 interconnects various components of the computing device 12 including the processor 14 and the computer-readable storage medium 16.

The computing device 12 may further include one or more input/output (I/O) interfaces 22 to provide interfaces for one or more I/O devices 24, and one or more network communication interfaces 26. The I/O interface 22 and the network communication interface 26 are connected to the communication bus 18. The I/O device 24 may be connected to other components of the computing device 12 through the I/O interface 22. The exemplary I/O device 24 may include a pointing device (e.g., mouse, trackpad, etc.), a keyboard, a touch input device (e.g., touch pad, touch screen, etc.), a voice input device, a sound input device, input devices such as various types of sensor devices and/or photographing devices, and/or output devices such as a display device, a printer, a speaker, and/or a network card. The exemplary I/O device 24 may be included in the computing device 12 as a component of the computing device 12, or may be connected to the computing device 12 as a separate device from the computing device 12.

Embodiments of the present disclosure may include a program for performing methods described in this specification on a computer, and a computer-readable recording medium including the program. The computer-readable recording medium may include any one or a combination of a program instruction, a local data file, a local data structure, etc. The medium may be designed and configured specifically for the present disclosure or can be typically available in the field of computer software. Examples of the computer-readable recording medium include a magnetic medium, such as a hard disk, a floppy disk, and a magnetic tape, an optical recording medium, such as a compact disc read only memory (CD-ROM) and a digital versatile disc (DVD), a hardware device, such as a floppy disk, and a hardware device specially configured to store and perform a program instruction, such as a ROM, a random access memory (RAM), and a flash memory. Examples of the program instruction may include a high-level language code executable by a computer with an interpreter, in addition to a machine language code made by a compiler.

According to the embodiments of the present disclosure, the conference system enables a bandwidth pattern obtained from one terminal to be shared with other terminals connected to the conference in the same area as the terminal, such that a process of identifying bandwidths of users connected to the conference in the area may be omitted, thereby reducing a time required for stabilizing a service quality. Particularly, quality deterioration, which may be caused by congestion when a plurality of users simultaneously access the conference in the same area, may be prevented.

Although representative embodiments of the present disclosure have been described in detail, it should be understood by those skilled in the art that various modifications to the aforementioned embodiments can be made without departing from the spirit and scope of the present disclosure. Thus, the scope of the present disclosure is not intended to be limited to the described embodiments, but should be defined by the appended claims and their equivalents.

What is claimed is:

1. A terminal configured to connect to a conference through a network, the terminal comprising:
at least one processor configured to:
identify a number of other terminals connected to the conference in a same area as the terminal, and to calculate a total number of users connected to the conference in the area based on the number of the other terminals;
determine a maximum bandwidth available in the network according to a loss or a delay pattern of data transmitted and received while the terminal is connected to the conference;
accumulate a bandwidth data pattern by mapping identification information for associating an area to which the terminal belongs at a time of the mapping before a time of the conference, time information indicating the time of the mapping, and information on a total number of users at the time of the mapping, with information on the maximum bandwidth at the time of the mapping;
pre-store the bandwidth data pattern; and
in response to other terminals newly connecting to the conference at the time of the conference, transmit the pre-stored bandwidth data pattern to the newly connected other terminals, wherein the identification information comprises one or more of a private internet protocol (IP) address, a Basic Service Set Identifier (BSSID), and a public IP address of the terminal.

2. The terminal of claim 1, wherein the at least one processor is further configured to multicast a confirmation message to confirm whether the other terminals exist in the area, and in response to receiving the confirmation message multicast by the other terminals, identify the number of the other terminals based on a number of the received confirmation message.

3. The terminal of claim 1, wherein the loss or delay pattern of the data comprises one or more of a maximum bandwidth available in the network without a loss or delay of the data, information on whether the loss or delay of the data occurs, a bandwidth used at a time when the loss or delay occurs, and resolution of an image transmitted and received at a time when the loss or delay occurs.

4. The terminal of claim 1, wherein the at least one processor is further configured to re-determine the maximum bandwidth every time the number of the other terminals, existing in the same area as the terminal, is changed.

5. The terminal of claim 1, wherein the at least one processor is further configured to:
   in response to receiving a push message indicating that one or more other terminals are newly connected to the conference, obtain information on whether the one or more other terminals exist in the area, and a total number of users connected to the conference in the area; and
   in response to determining that the one or more terminals exist in the area, refer to the identification information and information on the total number of users, to transmit bandwidth data, corresponding to the area and the total number of users, among bandwidth data items stored in the terminal, to the one or more other terminals.

6. A conference system comprising:
   the terminal of claim 1; and
   another terminal configured to receive bandwidth data from the terminal of claim 1, and to control a bandwidth used in a network by using the received bandwidth data.

7. The conference system of claim 6, wherein when including pre-stored bandwidth data, the other terminal is further configured to replace the pre-stored bandwidth data with the received bandwidth data by considering a determination on whether the pre-stored bandwidth data are more recent than the received bandwidth data, a determination on whether a loss or a delay occurs while obtaining the pre-stored bandwidth data, and a determination on whether a loss or a delay occurs while obtaining the received bandwidth data.

8. The conference system of claim 7, wherein the other terminal is further configured to, when the received bandwidth data are more recent than the pre-stored bandwidth data:
   in response to the determination on whether a loss or a delay occurs while obtaining the received bandwidth data being true, or in response to both the determination on whether a loss or a delay occurs while obtaining the received bandwidth data and the determination on whether a loss or a delay occurs while obtaining the pre-stored bandwidth data being false, replace the pre-stored bandwidth data with the received bandwidth data, and
   in response to the determination on whether a loss or a delay occurs while obtaining the received bandwidth data being false, but the determination on whether a loss or a delay occurs while obtaining the pre-stored bandwidth data being true, maintain the pre-stored bandwidth data.

9. The conference system of claim 7, wherein the other terminal is further configured to, when the pre-stored bandwidth data are more recent than the received bandwidth data:
   in response to the determination on whether a loss or a delay occurs while obtaining the pre-stored bandwidth data being false, but the determination on whether a loss or a delay occurs while obtaining the received bandwidth data being true, replace the pre-stored bandwidth data with the received bandwidth data, and
   in response to the determination on whether a loss or a delay occurs while obtaining the received bandwidth data being false, or in response to both the determination on whether a loss or a delay occurs while obtaining the received bandwidth data and the determination on whether a loss or a delay occurs while obtaining the pre-stored bandwidth data being true, maintain the pre-stored bandwidth data.

10. A method for controlling bandwidth, the method comprising:
    by a connection manager of a terminal configured to connect to a conference through a network, identifying a number of other terminals connected to the conference in a same area as an area of the terminal;
    by the connection manager, calculating a total number of users connected to the conference in the area based on the number of other terminals;
    by a bandwidth analyzer of the terminal, determining a maximum bandwidth available in the network according to a loss or a delay pattern of data transmitted and received while the terminal is connected to the conference;
    by a bandwidth manager of the terminal, accumulating a bandwidth data pattern by mapping identification information for associating an area to which the terminal belongs at a time of the mapping before a time of the conference, time information indicating the time of the mapping, and information on a total number of users at the time of the mapping, with information on the maximum bandwidth at the time of the mapping;
    by the bandwidth manager, pre-storing the bandwidth data pattern; and,
    by the bandwidth manager, in response to other terminals newly connecting to the conference at the time of the conference, transmitting the pre-stored bandwidth data pattern to the newly connected other terminals,
    wherein the identification information comprises one or more of a private internet protocol (IP) address, a Basic Service Set Identifier (BSSID), and a public IP address of the terminal.

11. The method of claim 10, wherein the identifying of the number of other terminals comprises multicasting a confirmation message to confirm whether the other terminals exist in the area, and in response to receiving the confirmation message multicast by the other terminals, identifying the number of the other terminals based on a number of the received confirmation message.

12. The method of claim 10, wherein the loss or delay pattern of the data comprises one or more of a maximum bandwidth available in the network without a loss or delay of the data, information on whether the loss or delay of the data occurs, a bandwidth used at a time when the loss or delay occurs, and resolution of an image transmitted and received at a time when the loss or delay occurs.

13. The method of claim 10, wherein the determining of the maximum bandwidth comprises re-determining the maximum bandwidth every time the number of the other terminals, existing in the same area as the terminal, is changed.

14. The method of claim 10, wherein the transmitting of the generated bandwidth data to the newly connected other terminals comprises:
- by the connection manager, in response to receiving a push message indicating that one or more other terminals are newly connected to the conference, obtaining information on whether the one or more other terminals exist in the area, and a total number of users connected to the conference in the area; and
- by the bandwidth manager, in response to determining that the one or more terminals exist in the area, referring to the identification information and information on the total number of users, to transmit bandwidth data, corresponding to the area and the total number of users, among bandwidth data items stored in the terminal, to the one or more other terminals.

15. The method of claim 10, further comprising, subsequent to the transmitting of the generated bandwidth data to the newly connected other terminals, controlling, by the newly connected other terminals, a bandwidth used in the network by using the received bandwidth data.

16. The method of claim 15, further comprising, prior to the controlling of the bandwidth, when the newly connected other terminals include pre-stored bandwidth data, replacing, by the newly connected other terminals, the pre-stored bandwidth data with the received bandwidth data, by considering a determination on whether the pre-stored bandwidth data are more recent than the received bandwidth data, a determination on whether a loss or a delay occurs while obtaining the pre-stored bandwidth data, and a determination on whether a loss or a delay occurs while obtaining the received bandwidth data.

17. The method of claim 16, wherein the replacing of the pre-stored bandwidth data with the received bandwidth data comprises, when the received bandwidth data are more recent than the pre-stored bandwidth data, in response to the determination on whether a loss or a delay occurs while obtaining the received bandwidth data being true, or in response to both the determination on whether a loss or a delay occurs while obtaining the received bandwidth data and the determination on whether a loss or a delay occurs while obtaining the pre-stored bandwidth data being false, replacing the pre-stored bandwidth data with the received bandwidth data, and in response to the determination on whether a loss or a delay occurs while obtaining the received bandwidth data being false, but the determination on whether a loss or a delay occurs while obtaining the pre-stored bandwidth data being true, maintaining the pre-stored bandwidth data.

18. The method of claim 16, wherein the replacing of the pre-stored bandwidth data with the received bandwidth data comprises, when the pre-stored bandwidth data are more recent than the received bandwidth data, in response to the determination on whether a loss or a delay occurs while obtaining the pre-stored bandwidth data being false, but the determination on whether a loss or a delay occurs while obtaining the received bandwidth data being true, replacing the pre-stored bandwidth data with the received bandwidth data, and in response to the determination on whether a loss or a delay occurs while obtaining the received bandwidth data being false, or in response to both the determination on whether a loss or a delay occurs while obtaining the received bandwidth data and the determination on whether a loss or a delay occurs while obtaining the pre-stored bandwidth data being true, maintaining the pre-stored bandwidth data.

* * * * *